United States Patent [19]

Poirier et al.

[11] 4,215,553
[45] Aug. 5, 1980

[54] ENERGY CONVERSION SYSTEM

[75] Inventors: Armand R. Poirier; Theodore J. Nussdorfer, both of Nashua, N.H.; John H. Stewart, Needham, Mass.

[73] Assignee: Sanders Associates, Inc., Nashua, N.H.

[21] Appl. No.: 918,888

[22] Filed: Jun. 26, 1978

[51] Int. Cl.³ .............................................. F02C 1/04
[52] U.S. Cl. ...................................... 60/650; 60/659; 60/682; 165/104 S
[58] Field of Search ................ 60/641, 652, 659, 650, 60/682; 165/104 S

[56] References Cited

U.S. PATENT DOCUMENTS

| | | | |
|---|---|---|---|
| 2,968,916 | 1/1961 | Taylor et al. | 60/659 X |
| 3,062,000 | 11/1962 | Percival | 60/659 |
| 3,677,008 | 7/1972 | Koutz | 60/650 |
| 4,010,732 | 3/1977 | Sawata | 60/641 X |
| 4,091,622 | 5/1978 | Marchesi | 60/659 X |

*Primary Examiner*—Allen M. Ostrager
*Attorney, Agent, or Firm*—Louis Etlinger; Richard I. Seligman

[57] ABSTRACT

An efficient split cycle solar energy conversion system utilizes sensible heat storage to isolate a solar receiver loop from a Brayton cycle engine loop. In this system a sensible heat storage unit is first charged by the solar receiver, is then switched to the inlet to the Brayton cycle turbine where it is discharged, and finally may be utilized as a high temperature, high effectiveness recuperator to recapture waste heat from the Brayton cycle turbine. With high effectiveness sensible heat storage recuperation, the Brayton cycle engine runs at extremely high efficiency. Moreover, since these storage devices can be run efficiently at low gas velocity, and since recuperated Brayton cycle engines become very efficient at extremely low pressure ratios, an overall thermal/electric conversion efficiency in excess of 60% can be obtained. Further, the Brayton cycle engine can be used with a sensible heat storage unit charged from a fuel fired source utilizing so-called "dirty" fuels, because fuel by-products which would ordinarily corrode the turbine blades of the Brayton cycle engine are either not picked up in the low velocity discharge of the storage unit or impinge on the blades at velocities low enough so that no damage is done to the blades.

18 Claims, 9 Drawing Figures

ENERGY CONVERSION SYSTEM

FIELD OF INVENTION

This invention relates to energy conversion systems and more particularly either to an improved solar energy conversion system utilizing sensible heat storage units switchable from a solar receiver loop to a Brayton cycle engine loop; or to improvements to Brayton cycle engines through the use of sensible heat storage units.

BACKGROUND OF THE INVENTION

With respect to solar energy conversions systems, while "latent" heat switchable storage units have been utilized in steam cycle solar energy conversion systems as illustrated in U.S. Pat. No. 2,933,855 issued to E. K. Benedek et al, Apr. 26, 1960, the benefits of a "sensible" heat storage system have heretofore not been utilized in a solar/Brayton cycle system.

One of the major problems with solar energy conversion systems utilizing steam is, in general, the extremely corrosive nature of superheated steam and the upper temperature limit associated with the tubing or plumbing used. In general, it is possible to heat up solar receivers to temperatures in excess of 2500° F. in situations utilizing a central receiver positioned at the focus of a mirror field which redirects sunlight onto the solar energy receiver. Thus, the capability of central receiver type installations far exceeds the restraints on superheated steam systems which, in general, must operate below 1000° F.

It will be appreciated that even the highest quality steels have limited strength at temperatures over 1650° F. and, therefore, new types of solar receivers and storage equipment are necessary if solar energy is to be efficiently converted into electrical energy. It will be appreciated that the higher the temperature of the working fluid or gas, the more efficient will be the conversion process.

In the present invention an air of Brayton cycle system is used instead of a steam cycle. Brayton cycle engines have the advantages of proven outstanding reliability and efficiencies 10–20% higher than the steam cycle engines. As will be seen, they integrate well with low cost sensible heat storage units, and become optimum at very low pressure ratios, which allows even higher reliabilities and high component efficiencies.

The solar energy conversion system described can withstand the high temperatures associated with central receiver type installations in which the receiver may be of the type that utilizes a ceramic honeycomb heat exchanger and in which sensible heat storage units of refractory materials are used so as to withstand the high temperatures.

In one embodiment, an efficient "split cycle" solar energy system includes a solar energy loop isolated from a Brayton cycle engine (turbine) coupled to an electric generator. The isolation is due to the use of sensible heat storage units. In the solar energy receiver loop a switchable sensible heat storage unit is charged by the solar receiver. The charged storage unit is then switched into the Brayton cycle turbine loop where it serves as the prime energy source for the engine. Finally, after it has been discharged, the unit may be utilized as a high temperature, high efficiency recuperator to recover waste heat from Brayton cycle turbine exhaust. The switchable sensible heat storage unit system is alternatively referred to as an "energy shift register" system.

The use of the sensible heat storage unit as a recuperator permits the Brayton cycle engine to be run at extremely low pressure ratios because the units are charged or discharged at low fluid stream velocity while still maintaining efficiency. This results in a thermal/electric conversion efficiency in excess of 60%, which can result in a solar/electric conversion efficiency in excess of 40%, as contrasted with steam cycle solar energy conversion efficiencies of less than 20%.

In the conventional Brayton cycle, large pressure losses occur in the heat addition cycle because heat is being added to a high velocity fluid stream. Also, penalizing temperature and pressure losses occur in the large recuperator needed to make low pressure ratio engines operate at high thermal efficiencies. In some types of ceramic wheel heat exchangers, there is significant leakage to further penalize performance.

The "energy shift register" system utilizing sensible heat storage improves the efficiency of Brayton engines by minimizing these losses. Heat addition occurs efficiently and slowly without significant pressure loss in a large insulated tank filled in one embodiment with alternated materials of different thermal conductivity which produce low conductivity in the flow direction. In one embodiment the storage unit is formed by spaced ceramic matrices or perforated ceramic elements. As the air passes through the matrices at velocities of 1 m/sec or less, a sharp thermocline (called herein a "step function" thermal gradient) develops; i.e., in a narrow region of the tank a major temperature gradient develops, and travels at approximately 1/1000 of the air velocity. As will be seen, this permits discharge of the tank at a uniform temperature. When the step function thermal gradient travels from one end of the tank to the other the tank is considered full and must be switched out of one position of the Brayton cycle into another. Hence, the name "energy shift register".

As can be seen, the sensible heat storage is utilized to isolate the receiver loop from the engine or electric power generating loop. Thus, the sensible heat storage unit provides a large buffer for the turbine and allows a high degree of flexibility in plant operation by allowing different rates of thermal energy collection and consumption.

In short, the isolation between the receiving loop and the engine loop buffers the engine against changes in solar flux due to the passing of clouds over the sun, etc., or from any receiver-related condition. Thus, the engine loop can be made and designed to run at maximum efficiency regardless of the operating conditions in the receiver loop.

Moreover, because of the isolation between the receiving loop and the engine loop in the subject invention, the solar receiver loop may operate at a different pressure than the engine loop, since the storage unit to be described can be discharged at any desired pressure. Separating the receiver from the pressurized engine loop permits the use of an "open-ended" ambient pressure solar receiver in which a "window" need not be used. The "open-ended" receiver typically operates at ambient pressure to reduce sealing requirements and for safety and low cost. This receiver also uses air which is a non-polluting working fluid. Moreover, when working at atmospheric pressure, the heat exchanger in the receiver may be assembled loosely to its housing to allow room for thermally induced motions.

While a split cycle solar energy conversion system with sensible heat storage has been described in which a Brayton cycle engine is utilized, it will be seen that the subject system involves improvements in the Brayton cycle system itself. The improvements to the Brayton cycle system include the use of a sensible heat storage unit both for recuperation and as a prime energy source.

As a prime energy source, operating the storage unit at low pressure makes it possible to run the Brayton cycle engine at highly efficient low pressure ratios. Moreover, energy for the Brayton cycle engine may be provided not only from the sun, but also from extremely "dirty" fuels. This is because deposits from the fuels are not picked up by the low velocity gaseous working fluid and do not reach the Brayton turbine blades to corrode them.

When the sensible heat storage unit is used as a recuperator, because of its extremely high effectiveness, the entire efficiency of the Brayton cycle system is significantly increased.

SENSIBLE HEAT STORAGE

It should be noted that the storage unit envisioned for use herein is a "sensible" heat storage unit as distinguished from a "latent" heat storage unit. The distinction between sensible heat storage and latent heat storage is that sensible heat is energy stored in the heat capacity of the materials in the storage unit so that every time a BTU of sensible heat is stored, the temperature of the material goes up proportionately. Thus, with every BTU added, the temperature of the material goes up, whereas in latent heat storage, there is a phase change in the material such that for every BTU added there is not necessarily any temperature change, but rather part of the material changes state, e.g., goes from liquid to gas or solid to liquid. In latent heat storage there is no change in temperature until all the material has experienced a phase change. It should be noted that the above-mentioned Benedek et al steam cycle plant utilizes latent heat storage. The major problem with latent heat storage is the corrosive nature of the phase-change materials used. In the Benedek et al patent sodium salt ($NaNO_3$) which is exceedingly corrosive is used as the phase-change material. Also the temperature is fixed for a given phase change material, which limits the temperature change over which latent heat storage units may operate.

Sensible heat storage has been utilized in the steel industry for over 150 years through the use of what are known as blast furnace stoves. A blast furnace stove is a heat exchange device used since the early 1800's in the glass and steel industries. In general, it consists of an insulated pressure shell containing an internal air duct and a large array of refractor bricks called "checkers". The checkers are arranged in stacks, often 30 meters high, forming a large number of individual air passages called flues, through which the air can flow. Heat is alternately stored in the checkers or removed from them during opposing portions of the process cycle. In the steel industry, these stoves are used to supply vast quantities of hot air into the blast furnaces which are charged with iron ore, coke, and limestone. The hot efflux of the furnace is piped into another "cold" stove where heat is extracted for use during the next blast period.

In a typical installation, a furnace will have three or four stoves manifolded together with automatic valves, with multiple stoves "on blast". The outputs of these stoves are controlled by heat sensors and valving so that the combined output temperature from the manifolded stoves remains constant. It should be noted that the output temperature of these stoves varies with time during the discharge cycle and, therefore, it is necessary to add and subtract heat as necessary depending on the sensed temperature of the air delivered to the blast furnace. Through an arrangement called staggered parallel operation the stoves are valved from one position to another to maintain constant output temperatures during the continuous operation of the furnace.

The ideal operating temperature for current blast furnace stoves is 2000° F. which has now been found to be ideal for efficient gas turbine operation. It has also been found that typical stoves deliver air at the same pressure as that required if the stove were to exhaust into a turbine designed for recuperated operation. Additionally, since blast furnace stoves are designed to handle large flow rates with low internal pressure losses, high Brayton cycle efficiency and thus, high thermal/electric conversion efficiencies can be maintained.

In summary, it has been found that the adaptation of blast furnace stoves to Brayton cycle power plants is unusually efficacious because of the ability to store and release huge quantities of heat at high temperatures; because of the ability to deliver large air flows; because of the ability to operate at the desired pressure levels; and because of the existence of automatic valving techniques to rapidly connect and reconnect stoves.

STEP FUNCTION THERMAL GRADIENT STORAGE

However, one problem with the use of the traditional blast furnace stove is that the outlet temperature drops 400°–500° F. during discharge, an undesirable condition for operating Brayton cycle machinery because it means either a loss in efficiency or that makeup heat must be provided.

As will be seen hereinafter, if it is not desirable to manifold and control numerous individual stoves, it is part of this invention to provide a novel sensible heat storage unit in which the above temperature drops are not experienced. This unit is called a step function thermal gradient storage unit. The term "step function" refers to a sharp temperature discontinuity between a "spent" region of the unit and a "charged" region of the unit. In other words, the temperature discontinuity is confined to a narrow region of the unit, typically a region 1/10 the length of the unit. Because of the "step function" operation, this sensible heat recovery unit is characterized by a constant output temperature at temperatures in excess of 2000° F. and makes possible efficient engine design.

For purposes of this portion of the invention, step functional thermal gradient storage units are characterized in that they have an overall anisotropy in that there is a low thermal conductivity in the flow direction as opposed to the lateral direction. In one embodiment, this is accomplished by spacing isotropic ceramic matrices along the flow path within the storage unit. In general, this results in a structure in which the spaced apart matrices or elements have a higher intrinsic as well as overall transverse conductivity than the conductivity of the material in between the elements, while the net longitudinal conductivity is lower than the matrix or the interstitial material due to the alternating "series" arrangement. This results in a battery-like opration of the storage unit, such that until the storage unit is completely discharged, the output termperature of the fluid from the storage unit stays constant. This is because there is a sharp "step function" differential in temperature within the storage unit as energy is withdrawn from or added to the unit. The sharp temperature change takes place in a narrow region of the unit and travels from the inlet end of the storage unit towards the outlet end during the discharge operation. Prior to the step function thermal gradient reaching the output port of the storage unit, energy is taken out of the storage unit at essentially a constant temperature. In essence, therefore, the storage unit can be conceived of as a battery whose output does not vary during the discharge cycle until the battery is completely discharged.

SENSIBLE HEAT STORAGE RECUPERATION FOR BRAYTON CYCLE ENGINES

When a sensible heat storage unit is used to replace a recuperator in the Brayton cycle, the sensible heat storage unit provides for a recuperator having close to 100% effectiveness and the pressure drops in this type unit are significantly lower than those of a conventional recuperator with the same effectiveness. For the present purpose, "effectiveness" is defined as the ratio of the discharged heat to the charge heat. Since low velocities are needed to achieve high effectiveness in a sensible heat storage recuperator, there is an accompanying advantage of a low pressure drop during the heat exchange. These two advantages combine and permit the use of extremely low pressure ratio turbines and results in the overall thermal/electric conversion efficiency which may be in excess of 60%.

Thus, a feature of the subject invention is that in one embodiment, the cycle efficiency of the engine optimizes at extremely low pressure ratios less than 2 due to the use of ~100% effectiveness recuperators. This is because in recuperated gas turbine engines, the lower the pressure ratio, in general, the higher will be the efficiency of the turbine, albeit at the expense of size, weight and air flow which are not critical in this application. It should be noted that the optimum pressure ratio is very sensitive to recuperation losses at the low pressure ratios. Thus, in order to achieve the theoretical efficiency associated with low pressure ratios, an effective recuperator must be used.

With a recuperator having an effectiveness approaching 100%, it is possible when utilizing this recuperator in the Brayton cycle engine to run the Brayton cycle engine at low pressure ratios approaching 1.3:1, which can result in the above-mentioned overall thermal/electric efficiency in excess of 60%. Heretofore, recuperated Brayton cycle engines have usually had pressure ratios on the order of 2–6 or better, with the pressure ratio being defined as the compressor outlet pressure divided by compressor inlet pressure.

It is thus a finding of this invention that a sensible heat storage unit can be utilized to replace the relatively low effectiveness metal recuperators currently utilized in Brayton cycle systems and that the effectiveness of this unit approaches 100%. Thus, larger, low pressure ratio engines may be efficiently utilized in the engine loop. While this invention envisions pressure ratios of 1.3:1–2.0:1 as being extremely low, pressure ratios less than 6 are considered low for recuperated Brayton cycle engines.

It should also be noted that conventional metal recuperators generally degrade significantly at temperatures in excess of 1650° F. and, therefore, are not suitable working at temperatures at 2000° F. or higher, which are typical of advanced central receiver systems mentioned before. The thermal fatigue of the metal by thermal cycling limits the life of a metal recuperator. Thus, the materials generally used in the subject storage units are non-metallic and preferably ceramic materials such as mullite, since mullite can withstand temperatures well in excess of 1650° F. without substantial degradation.

In summary, in order to operate at overall conversion efficiencies in excess of 60% a recuperator equivalent operating at close to 100% must be used and the sensible heat storage stove has been shown to operate at an effectiveness above 95%. This should be compared with current recuperators of the metallic type whose effectiveness ranges about 70%, with the highest known recuperation effectiveness being 88% as represented by a recuperator locaed in Oberhausen, Germany. It will be appreciated that increasing the effectiveness of a "conventional" high-effectiveness recuperator from 88% to 95% would result in an unreasonable increase in size and cost in which the already large size may be tripled.

OPEN/CLOSED CYCLE BRAYTON SYSTEM WITH STORAGE

As to the type of Brayton cycle engine utilized, it may be utilized in an open loop system with air, in which the air is vented to the atmosphere after charging one of the above-mentioned heat storage units. Since air is utilized, there is no pollution problem, and very little energy is lost in this system.

The subject invention may also be utilized in a closed loop engine cycle. The advantage of utilizing a closed loop system is that very high efficiencies can be maintained even when there is a varying load at the output of the Brayton cycle engine. This means that the aforementioned 60% transfer efficiency can be maintained with load swings of up to 80%. The reason for the maintaining of the efficiency will be described hereinafter in connection with the closed loop system.

FUEL FIRED SOURCE FOR BRAYTON CYCLE ENGINES

As will be seen, the use of low pressure sensible heat storage units with the Brayton cycle engine allows Brayton cycle engines to be run from fossil fuel or biomass heated storage units instead of solar heated units. Thus, kerosene, oil, coal or even woodchips can be used to provide energy to the Brayton cycle engine. These fuels would ordinarily corrode turbine blades and drastically limit equipment lifetime. However, with low pressure sensible heat storage units, "dirty" by-products are not picked up by the gas stream to any great extent and never reach the turbine blades. Moreover, those limited numbers of particles which do reach the turbine blades, are picked up at low velocities and therefore are minute particles of the order of 1 micron in diameter. These small particles do very little damage to turbine blades and therefore permit the use of Brayton cycle engines in continuous duty base power plants, as opposed to peak power plants which use expensive "clean" fuels. Low pressure storage units also reduce pressure losses which increases Brayton cycle efficiency. It will, therefore, be obvious that at least in part, this invention is not strictly limited to solar energy applications.

It is, therefore, an object of this invention to provide an efficient solar energy conversion system.

It is another object of this invention to provide a solar energy conversion system utilizing a Brayton cycle engine in which the receiver loop is completely isolated from the engine loop by virtue of a switchable sensible heat storage unit.

It is a further object of this invention to provide an improved Brayton cycle engine by virtue of the utilization of a sensible heat storage unit in place of the conventional recuperator.

It is a still further object of this invention to provide sensible heat storage unit for utilization in a Brayton cycle engine.

These and other objects will be better understood in view of the following detailed description when viewed in light of the accompanying drawings in which:

DETAILED DESCRIPTION

Figure 1:
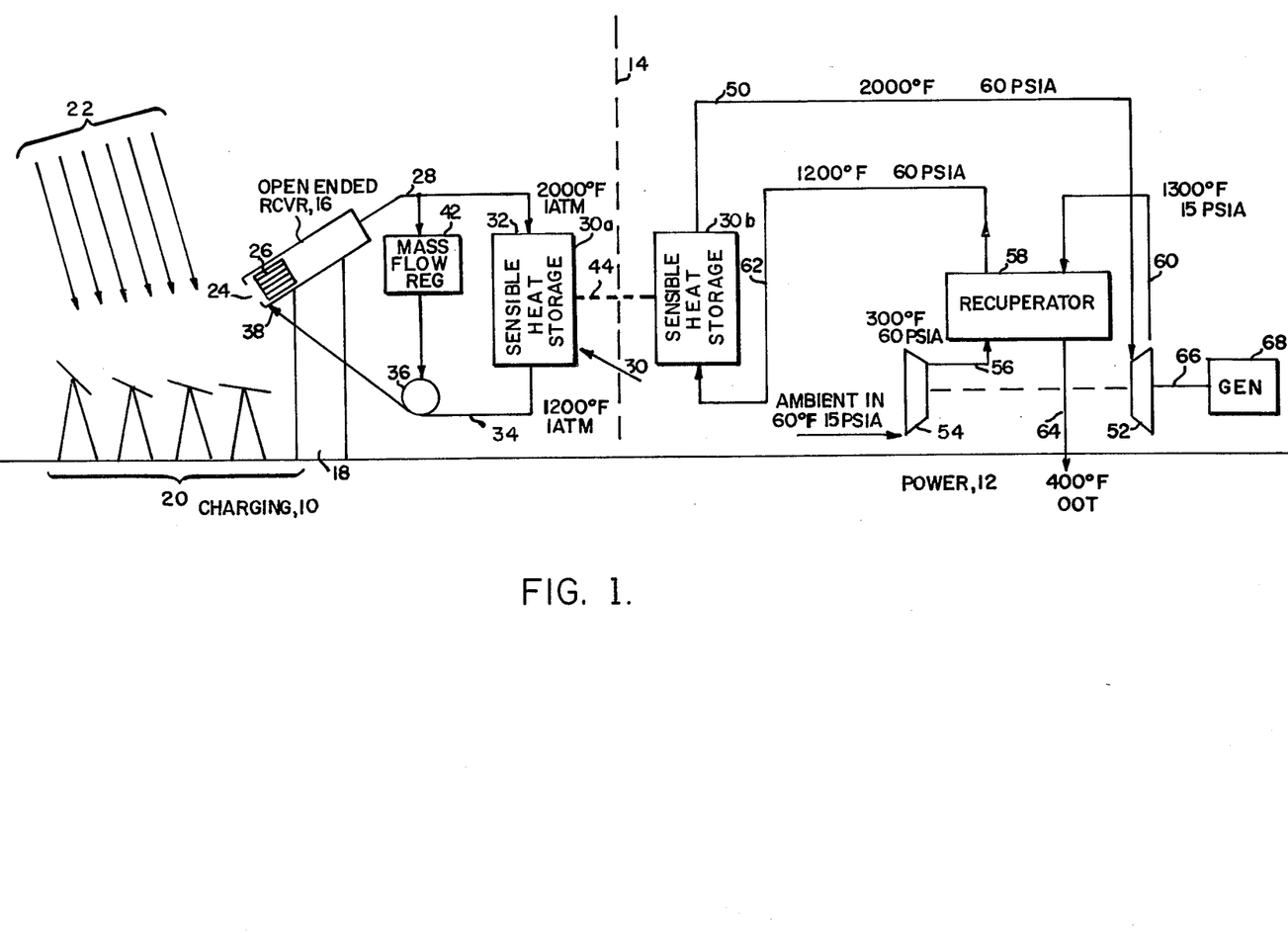
FIG. 1 is a diagrammatic illustration of an isolated loop thermal/electric conversion system in which the charging loop includes an open-ended solar receiver and in which the engine loop includes a Brayton cycle engine.

Referring now to FIG. 1, in one embodiment, the subject invention includes a charging loop generally designated by reference character 10 and a power loop generally designated by reference character 12, separated by dotted line 14. In the charging loop is located, in one embodiment, an open-ended solar receiver 16 mounted on a tower 18 which is at the focus of a mirror field generally indicated at 20. Mirror field 20 redirects solar rays 22 through the open-end 24 of the solar receiver and onto a heat exchanger 26 located within the receiver. The heat exchanger may be a ceramic honeycomb matrix made of silicon carbide. In one embodiment, this open-ended receiver operates at atmospheric pressure so that its output over line 28 carries air at 2000° F. and 1 atm. to a sensible heat storage unit 30 at position 30a. The input to the sensible heat storage unit at 30a is designated 32, and its output 34. In one embodiment, prior to being completely filled, the sensible heat storage unit is initialized at 1200° F. Output 34 is connected to a suitable fan or blowing system 36 which exhausts to the front end of the solar receiver as shown by return line 38.

In operation, air is sucked from return line 38 and is heated as it passes through heat exchanger 26 which is heated by the focused solar radiation (called "insolation") from the mirror field. With proper pressure adjustments, the pressure drop across the open end 24 of the receiver can be reduced to zero thereby eliminating the need for a window. The hot air downstream of the heat exchanger is coupled to the inlet of the sensible heat storage which initially is at 1200° F.

The sensible heat storage unit at 30a is charged to capacity by the incoming hot air such that at some time after the charging has begun, the entire sensible heat storage unit is at 2000° F. The flow through the sensible heat storage unit is adjusted by a mass flow regulator 42 which adjusts the mass flow of blowing system 36 in accordance with the sensed temperature so as to maintain the receiver outlet air temperature at 2000° F.

When the sensible heat storage unit at 30a is charged to capacity, it is shifted by conventional valving techniques from its position shown to the left of dotted line 14 to the position 30b to the right of dotted line 14 as illustrated by arrow 44. In the position illustrated by 30b, the sensible heat storage unit acts as a prime source of energy for the power loop.

In the illustrated case, the sensible heat storage unit at position 30b is discharged at 60 psia and at a temperature of 2000° F. over line 50 to the turbine section 52 of a Brayton cycle engine. The engine includes a compressor 54 which compresses ambient air at 60° F. and 15 psia to raise the temperature of the incoming air to 300° F. and to raise the pressure to 60 psia. The output of the compressor at 56 is connected to a conventional recuperator 58. At this point, the 300° F. air from the compressor section captures waste heat from the output of turbine section 52 via line 60 which is coupled to recuperator 58. This line carries air at 15 psia at 1300° F. In the process, the temperature of the air from the compression section goes from 300° F. to 1200° F. and is delivered over line 62 to the input end of the sensible heat storage unit at position 30b. When the unit at 30b is discharged from 2000° F. to 1200° F., it is switched back to position 30a for recharging.

It should be noted that the output 64 of the recuperator corresponding to input line 60 exhausts air to the atmosphere at approximately 400° F.

As shown, the mechanical turbine output is illustrated by dotted line 66 and is coupled to a conventional electric generator 68.

The advantage provided by the system of FIG. 1 is the ability to separate the solar collection cycle from the turbine cycle by using highly efficient sensible heat storage. Operationally, this offers the user the advantage of scheduling power outputs to meet demand without direct dependence upon instantaneous availability of focused sunlight. As mentioned hereinbefore, sensible heat storage in the form of checker stoves may, if properly manifolded, be utilized. Single sensible heat storage units may also be used, especially if modified for step function thermal gradient operation.

In the subject system, all energy passes through a storage unit. This provides a large buffer for the turbine as the only storage losses are those associated with insulation losses through the storage unit wall and losses involved in pressure/switching of the sensible heat storage units. These sensible heat storage units also provide a high degree of flexibility in the plant operation by allowing different rates of thermal energy collection and consumption.

By the ability to isolate the charging loop from the power loop, it is now possible to utilize a solar receiver which differs from conventional configurations in that it does not utilize a standard high pressure tube/boiler technique. The open-ended solar receiver captures and transfers heat at pressures near atmospheric, utilizing a material and a configuration that is a highly efficient absorber of solar radiation. The aforementioned honeycomb heat exchanger operates with a very low pressure drop (less than 1 inch $H_2O$) thus reducing the air sealing requirements and permitting the honeycomb components of the heat exchanger to be assembled loosely to allow room for thermally-induced motions. Since the entire receiver operates at near atmospheric pressure, safety hazards and the cost of the pressure vessel are minimized.

In passing, the open cycle Brayton concept has several important advantages. The basic gas turbine cycle is simply implemented compared to steam cycles. The reduced maintenance associated with gas turbines is enhanced by the reduction of the corrosion problems due to fuel combustion products. In addition, the energy efficient, open-cycle air system permits direct rejection of residual (waste) heat to the atmosphere, eliminating the need for large quantities of cooling water.

Moreover, the engine can be mounted at the concentrator focus and closely coupled to the solar receiver. As will be seen, when the recuperator is in the form of a sensible heat storage unit, it is lightweight and can also be mounted with the receiver/engine unit, providing an integrated thermal conversion system with short piping and low thermal losses.

In summary, because of the use of the split cycle, an open-ended receiver can be used which uses air as the working fluid. Moreover, heat collection and power generation is accomplished in separate, independent heat transfer loops. Additionally, since the power generation system works from storage, it is independent of short term fluctuations and solar radiation. Finally, the use of sensible heat storage units for storage significantly increases system efficiency because it actually fulfills a recuperator/heat exchanger function as well as storage/delay.

In the system illustrated, either one or two storage units are used which are sequentially valved into one of the two positions shown. In another type system, a third and even a fourth unit may be used for additional storage and recuperation.

STEP FUNCTION THERMAL GRADIENT STORAGE UNIT

As will be seen, it is desirable for the storage unit to have what is known as a "step function thermal gradient" in which the temperature difference between two adjacent locations is very sharp. This means that the transition between one temperature and another temperature within the storage unit occurs in a transition zone of less than 1/10 the total flow path length of the unit. This is accomplished in one embodiment by providing high density, high heat capacity, high conductivity matrices at spaced locations along the flow path such that, in general, the thermal conductivity in the direction of flow is minimized.

As outline in an article by D. J. Close entitled, *Rock Pile Thermal Storage for Comfort Air Conditioning*, Instrumentation Engineering Australia (Mechanics & Chemical Engineering Transcripts), Vol. MC. 1 (#1), at page 14, the works of Schumann (*Heat Transfer: A Liquid Flowing Through a Porous Prism*, J. Franklin Inst., Vol. 208, Sept., 1929, pp. 405-16) and Furnas (*Heat Transfer from a Gas Stream to a Bed of Broken Solids*, Amer. Inst. Chem. Engrs. Transcripts, Vol. 24, June, 1930, pp. 142-69) on packed beds indicate that there is an assumption that the bed has zero conductivity in the flow direction and infinite conductivity in planes normal to it. However, Close, later on in his article, indicates that these assumptions for the rock pile thermal storage are incorrect because so little is known about the actual operation of rock piles when used as thermal storage. On page 17 of the Close article Close says that certain factors suggest that the simple theory is inadequate and that it would be instructive to examine the validity of the main assumption of zero conductivity of the packing in the flow direction and infinite conductivity perpendicular to it. Thus, according to Close, the assumptions by Schumann and Furnas are all subject to scrutiny and extensive testing.

On the other hand, a computer program and algorithm have now been developed which evaluate all of the types of energy transfer within the rock pile on a point-by-point basis. It has been found that, indeed, as Close suspected, there is not infinite conductivity in planes normal to the flow path, nor is there zero conductivity in the flow direction.

In the subject invention these anisotropic characteristics can be made to occur within the sensible heat storage unit by specialized structure within the unit, and that having done so, the transition zone for the thermal gradient can be kept small, of the order of 1/10 the overall flow path length. This provides a step function thermal gradient which permits the storage unit to discharge at a substantially constant temperature until the gradient travels from the inlet end of the storage unit completely to the outlet end.

In other words, there is a large thermal gradient between the "charged" portion of the storage unit and the "spent" or uncharged portion of the unit. Because the gradient travels from the inlet to the outlet end at a relatively low speed, and because the transition is kept to a small area, the discharge temperature of the unit is maintained substantially constant throughout the discharge cycle. This type of operation is not possible with uniform packed beds operating at the temperatures and pressures specified in the above-mentioned articles. What is therefore necessary is to modify the packed bed structure to give it an anisotropic property of low thermal conductivity in the flow direction and higher thermal conductivity lateral to the flow direction.

This anisotropic property results in the step function thermal gradient and is made to occur in the subject invention by the alternation or lamination of materials of different thermal conductivity along the flow path in the storage unit, or by the use of anisotropic materials in the storage unit.

In order to produce a step function thermal gradient, it is desirable to reduce transverse gradients while maximizing gradients in the flow direction, with the sharpeness of the thermocline being dependent upon low conductivity in the flow direction. Therefore, it is a characteristic of the subject storage unit that high conductivity in the flow direction is materially reduced, thereby to provide a step function thermal gradient.

It is possible to produce this step function thermal gradient by using laminated structure made up of isotropic materials. Thus, it is a finding of this invention that isotropic elements may be used to achieve a step function thermal gradient of the type described, while helping uniformity of heat transfer in the transverse direction.

It is also a finding of this invention that the step function thermal gradient can be achieved by providing spaced regions having a conductivity transverse to the flow path which is higher than the conductivity of the material along the flow path in the spaces inbetween these regions.

It will be appreciated that the anisotropy in the above-mentioned embodiment is due to the laminated configuration of the storage unit, as opposed to any anisotropic property in the materials used. It will, however, be appreciated that anisotropic materials could be used in place of the laminated structure. These anisotropic materials exist and in general, are single crystal solids. However, single crystal solids are usually too expensive for use in the subject system.

Figure 2A:
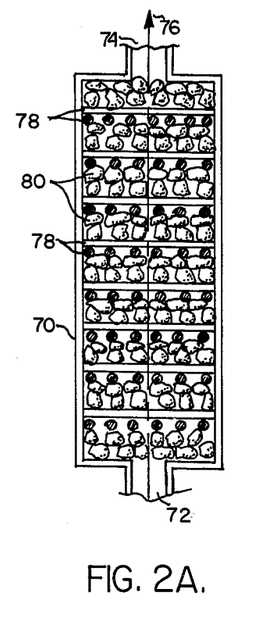
FIGS. 2A and 2B diagrammatically illustrate in cross-section step function thermal gradient storage units which may be utilized as the sensible heat storage units illustrated in FIG. 1.
Figure 2B:
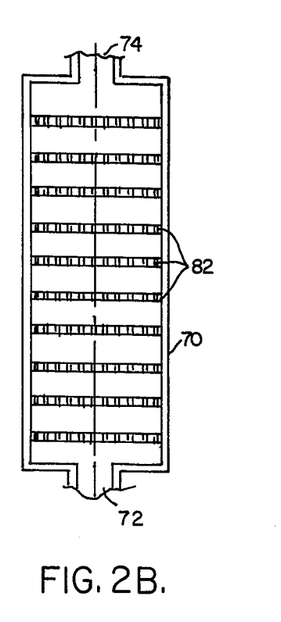

Referring to FIGS. 2A and 2B, there are shown two different types of sensible heat storage units in which a step function thermal gradient can be achieved.

With respect to FIG. 2A, the unit may have a housing 70 having an inlet 72 and an outlet 74 in which the flow direction and path is indicated by dotted arrow 76. This unit is packed with spaced apart isotropic structures 78 which may be rods or matrices of metal or materials such as mullite or cordierite. It will be appreciated that these structures are spaced apart along a flow path indicated by arrow 76. In between these structures are regions 80 which may be filled with material having a lower thermal conductivity in the flow direction, such as clay refractories which have a conductivity of 0.1 BTU/Hr. /sq. ft.

As shown in FIG. 2B, unit 70, may carry segments 82 which may be honeycomb discs or perforated blocks of mullite or cordierite to provide for the higher thermal conductivity in the transverse direction than the spaces therebetween. The low thermal conductivity areas 84 are merely provided by spaces occupied by air or other gases passing through the unit. A property of the above-mentioned materials is also that they retain heat. Thus, alternatively, what is provided are spaced segments of high heat retaining material.

Alternatively, any higher thermal conductivity segment transverse to the flow path may be utilized, such as corrugated materials interspaced with flat materials of the same material structure (not shown). Transverse metal plates may be used now and then to get maximum net anisotropy if needed.

The important aspect of the unit is that in order to achieve the step function thermal gradient, there are regions spaced apart and transverse to the flow path which have higher thermal conductivity than that of the spaces in between these regions.

Figure 3:
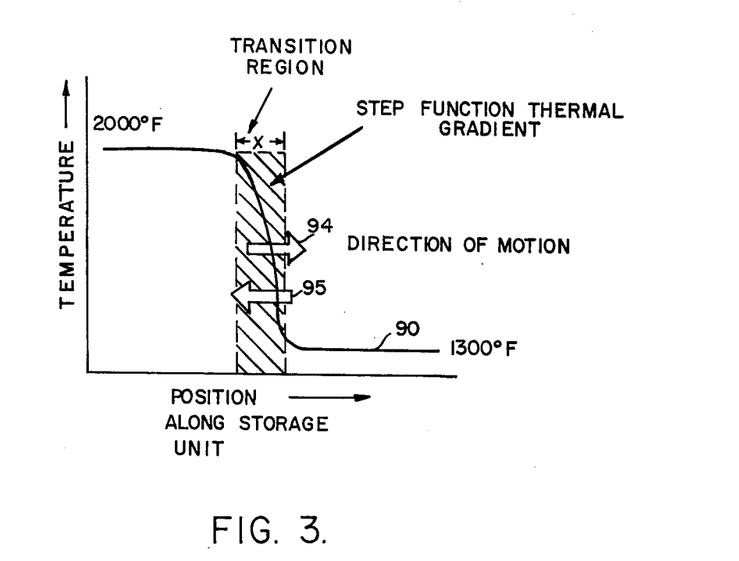
FIG. 3 is a graph illustrating the "step function" characteristic of the step function thermal gradient storage units of FIG. 2, showing the direction and motion of the thermal gradient during either the charging or discharging cycle.

Referring to FIG. 3, a graph is shown of the step function thermal gradient. This step function thermal gradient is shown by solid line 90 for the charging or discharging case. During charging, the step function thermal gradient moves from the left to the right, from the inlet end of the thermal storage unit to the outlet end as indicated by arrow 94. During discharge, the step function moves in the reverse direction as indicated by arrow 95. The transition region which carries the step function thermal gradient has a length in the flow direction indicated by x. As indicated hereinbefore, a step function thermal gradient is, in essence, defined by the fact that the transition region between one temperature and another in the storage unit occupies a distance along the flow path of less than some small fraction of the total flow path distance between the inlet to the storage unit and the outlet. Thus, in one embodiment in the charging cycle the temperature in the storage unit goes from 1300° F. to 2000° F. over a distance of x which is less than 1/10 the total flow path length through the unit.

While the fraction 1/10 is utilized, for explanation purposes, it should be appreciated that the step function may vary substantially. It is distinguished from a gradual thermocline in that there is a narrow transition region which is well defined within the storage unit where the thermal gradient occurs. Portions of the storage unit to either side of the transition region therefore exist at a substantially uniform temperature.

It will be noted that due to the symmetry of the step function thermal gradient storage units, these may be charged and discharged in any direction. As such, they are said to be "bi-directional".

Alternatively, the thickness and thermal conductivity of the materials utilized within the unit may be given asymmetric properties such that they are no longer bi-directional. In this case, it might be useful to make the transition portions at the outlet end of greater thickness than those at the inlet end.

Brayton Cycle System with Sensible Heat Storage Recuperation

As mentioned hereinbefore, one of the major properties of the subject system is that it utilizes a Brayton cycle engine, in which sensible heat storage is substituted for conventional recuperation. The purpose of the substitution is to provide a recuperation system in which the effectiveness of the recuperation approaches 100%. This, in turn, increases the efficiency of the Brayton cycle turbine in that, although the size and weight of the machine increases over non-recuperated jet engines, its efficiency is greatly increased due to the highly efficient recuperation. Moreover, sensible heat storage units may be discharged at low gas velocity. This permits designing Brayton cycle engines with low pressure ratios. With low pressure ratios and lower engine rotational speeds, higher temperatures can be accommodated by the unloading of the blades. Working at higher temperatures, in turn, results in greater efficiency.

With low pressure ratios, turbine blade stress decreases so that either the turbine is longer-lived and more reliable, or the turbine-inlet temperature can be substantially increased for the same life, giving a substantial increase in cycle efficiency. Also, noise is reduced to negligible levels and part-load performance is greatly improved over that of a high pressure ratio machine.

While weight and size are indeed a factor in non-recuperated Brayton cycle engines such as aircraft turbines, in the present application, the weight and size are not critical. Moreover, large engines offer a significant advantage in electric power generation since low pressure ratios result in reduced specific power. It is, therefore, possible to utilize large Brayton cycle engines with close to 100% recuperation, such that the overall thermal/electric conversion efficiency exceeds 60%. Note, that Brayton cycle efficiency is critically sensitive to recuperator effectiveness.

Figure 4:
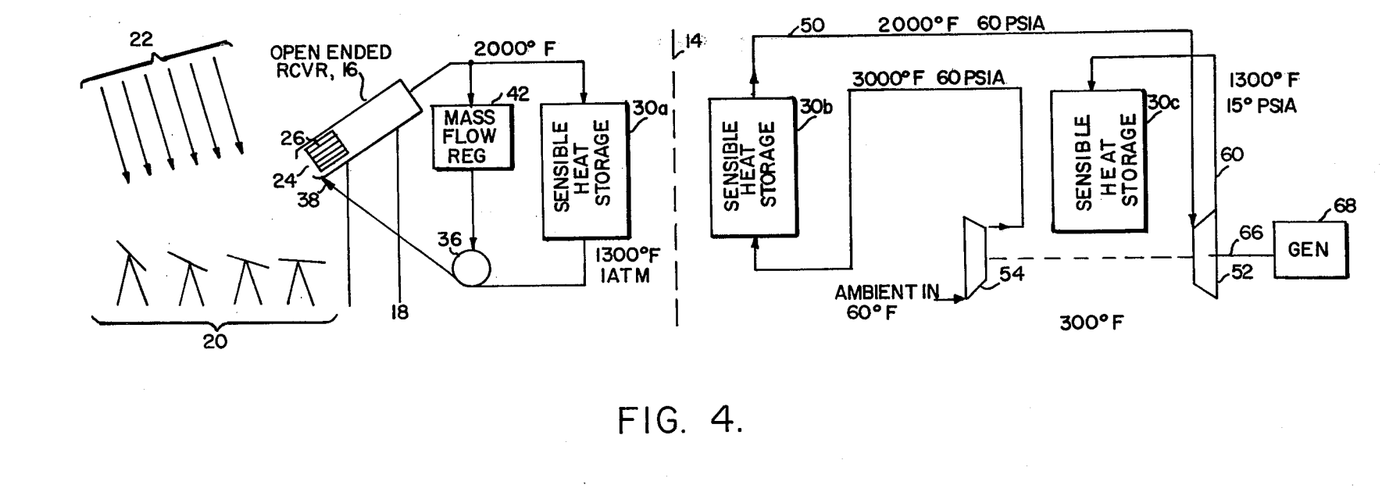
FIG. 4 is a diagrammatic illustration of a Brayton cycle system illustrating the open-cycle power loop case in which a sensible heat storage unit replaces the recuperator for the Brayton cycle engine and is vented to atmosphere.
Figure 6:
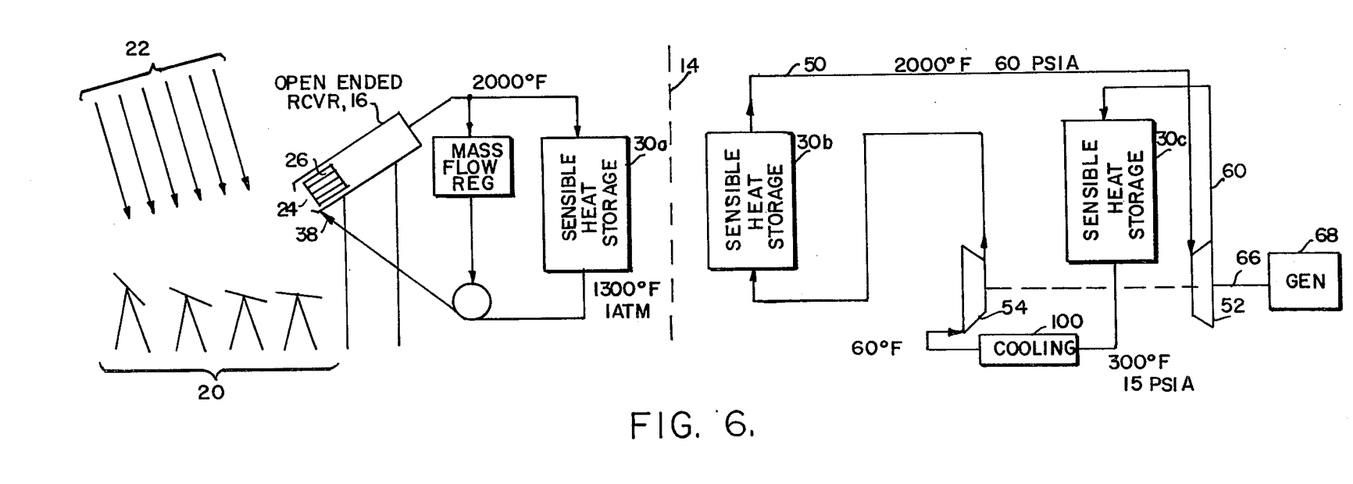
FIG. 6 is a diagrammatic illustration of a Brayton cycle system utilized in a closed cycle mode in which a sensible heat storage unit replaces the recuperator for the Brayton cycle engine, the output of which is recycled through a cooling unit to the input of the Brayton cycle engine.

Sensible heat storage may be used to replace conventional recuperators either in an open cycle system such as illustrated in FIG. 4 or in a closed cycle system as illustrated in FIG. 6. In either case, the conversion effectiveness of the sensible heat storage unit is well in excess of the usual 70%–80% associated with standard metallic recuperators.

As illustrated in FIG. 4, a sensible heat storage unit at position 30c is initially at 300° F., since this is the fully discharged temperature of the unit after it has served to power the turbine. During recuperation this unit captures the 1300° F. waste heat from the turbine section of the Brayton cycle engine. As shown, the unit is exhausted to the atmosphere and the outlet temperature of the exhausted gas is 300° F. until the unit is completely charged to 1300° F. When this unit is charged to 1300° F., it is returned to position 30a and its 1300° F. energy is combined with the energy from the solar energy receiver so that it acts in the nature of a recuperator in that the waste heat is recaptured. Note, the reference characters in FIGS. 4 and 6 are identical to those of the similar system illustrated in FIG. 1 to the extent applicable.

It will be appreciated that in the open cycle system, 300° F. air is vented to the atmosphere during recuperation which, as mentioned hereinbefore, is non-polluting. The reduction of 100° F. lost heat from 400° F. (FIG. 1) to 300° F. (FIGS. 4 and 6) is due to the near 100% sensible heat recuperation and the low pressure ratio engine. This 100° F. difference accounts for initialization of the storage unit in the receiver loop at 1300° F. instead of 1200° F. (FIG. 1).

It will be noted that the sensible heat storage unit is located first at position 30a, then at position 30b, and finally at position 30c. In actual operation, three or even four separate storage units may be utilized.

Figure 5:
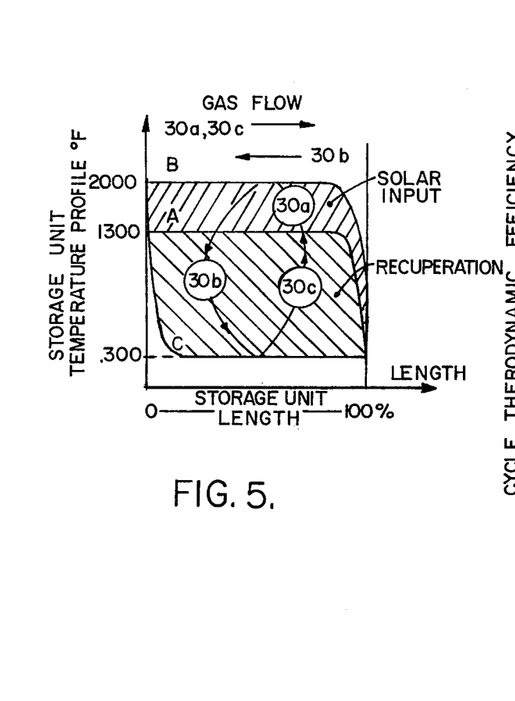
FIG. 5 is a graph illustrating storage unit temperature versus location along the length of the storage unit, for various fhnctions of the storage unit.

Referring to FIG. 5, a graph is shown of the thermal storage unit temperature profiles. Curve A shows the profile for the unit as charged after recuperation. Curve B shows the profile for the unit fully charged after solar input. Curve C shows the profile of the "empty" unit after discharge into the Brayton cycle turbine.

When the storage unit is operating in position 30c as a recuperator, it is charging as shown by arrow 30c. As shown by Curve A, at the end of the recuperator charging cycle, the storage unit temperature finally reaches approximately 1300° F. Thereafter, the unit is switched to position 30a where, as indicated by arrow 30a, an additional amount of energy is added to this unit corresponding to the solar input.

Curve B illustrates the final condition after solar charge. When the thermal energy storage unit is "full", it is typically at 2000° F. Then this unit is moved to position 30b where it is utilized as a prime source of energy for the engine loop and is discharged as indicated by arrow 30b.

Curve C illustrates the final condition of the "empty" storage unit after discharge. When this storage unit is discharged, it finally resides at a temperature which is approximately 300° F. When it has been discharged, it is moved to position 30c where it is again recharged by the waste heat from the turbine section of the Brayton cycle engine. This charging cycle is illustrated by arrow 30c. Gas flow directions for the various positions of the storage unit are illustrated by the arrows at the top of the diagram. This describes the charging and discharging cycle for a Brayton cycle system using storage type recuperation. What is now described is a Brayton cycle system utilized in a closed cycle mode.

Referring to FIG. 6, in this system, the storage unit at 30c is discharged into a cooling unit 100 which cools the outlet gas from the unit from 300° F. at 15 psia to 60° F. at 15 psia and couples it to the compressor section 54 inlet which compresses the gas to 60 psia and delivers it at a temperature of 300° F. to the sensible heat storage unit at 30b. Otherwise, the switching of the storage unit is the same as discussed in FIGS. 4 and 5.

One reason for the utilization of the closed cycle system is that expensive gases other than air may be utilized in the system. More importantly, however, the closed cycle system is considerably less sensitive to load changes at output shaft 66 of the turbine. This type of system would ordinarily be used for a part load operation. With the closed cycle, the system can operate at different pressure levels, whereas in the open cycle, the system starts off by the compressor taking in air at ambient pressure. The closed cycle thus allows the system to operate at input pressures greater or less than ambient pressure for a given load level. If, for instance, load conditions were such that less power were necessary, then the pressure in the system could be proportionally reduced to obtain the same efficiency. In an open cycle with reduced loading, the rpm of the turbine would have to be changed which would reduce the efficiency.

The closed cycle thus allows one to reduce the internal pressure and how much mass is actually running through the system while keeping the same pressure ratio. This permits very good efficiency in off design operation so that, for instance, if the load is only 20% of maximum design, the system can still operate at efficiencies exceeding 60%.

Optimum Theoretical Design

Figure 7:
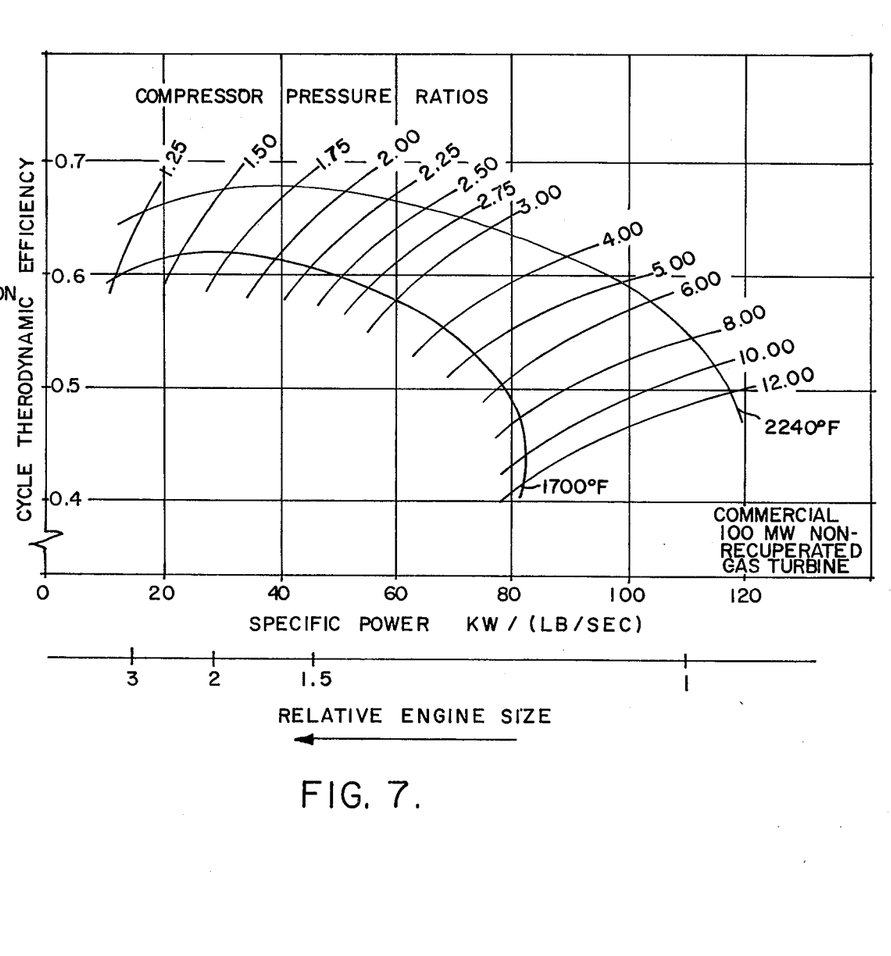
FIG. 7 is a graph illustrating compression ratios versus thermal efficiency for various turbine inlet temperatures and for various engine sizes in which optimal compression ratios for a given size unit operating at a given temperature can be ascertained.

A graph of the thermo-dynamic efficiency versus specific power with temperature at turbine inlet and pressure ratio (compressor) is shown in FIG. 7. The thermo-dynamic efficiency illustrated in computed for a compressor polytropic efficiency $\eta_c = 0.90$; a turbine polytropic efficiency $\eta_t = 0.90$; a recuperator effectiveness of $\epsilon = 1.0$; a total relative pressure drop of 0.05. Pressure ratios giving maximum thermal efficiency have been calculated and are illustrated. In the graph illustrated, the effect of utilizing a sensible heat storage as a recuperator yields an optimum pressure ratio of $\sim 1.5:1$ to obtain a cycle efficiency increase of over 60%, even for turbine inlet temperatures as low as 1700° F. Note that there is a limit to the amount that one can reduce pressure ratios to achieve higher system efficiencies. Assuming that the compressor and turbine efficiencies are 0.90, figures which are regularly exceeded in large gas turbines, and assuming the pressure losses, as before, stay at 0.005, and assuming the recuperator effectiveness $\epsilon = 100\%$, then as can be seen from FIG. 7, the lower the pressure ratio (up to a given maximum in the curve) and the higher the turbine inlet temperature, the higher will be the overall efficiency of the entire system. As mentioned hereinbefore, the high efficiency of the Brayton cycle engine depends critically on recuperation which yields close to 100% effectiveness. This, in fact, improves the efficiency of Brayton cycle engines to 60% or better. Note, commercial 100 MW non-recuperated gas turbines operate at 25% efficiency.

In summary, it is a finding of this invention that by adding the sensible heat recuperator in the Brayton cycle, lower pressure ratio compressors and turbines are more efficient, both by virtue of better recuperation and by virtue of their lower operating speeds at fixed levels of blade and vane loading. Lower operating speeds also result in reduced inlet relative Mach numbers which, in turn, reduce component sensitivity variations and manufacturing tolerances. Reduced inlet relative Mach numbers increase compressor range of operation which often result in modest increases in part load operating efficiency. Lower operating speed also reduces blade stress, permitting, in the case of centrifugal compressors, utilization of increased back sweep to improve performance and range of operation.

Fuel Fired Brayton Cycle System

Figure 8:
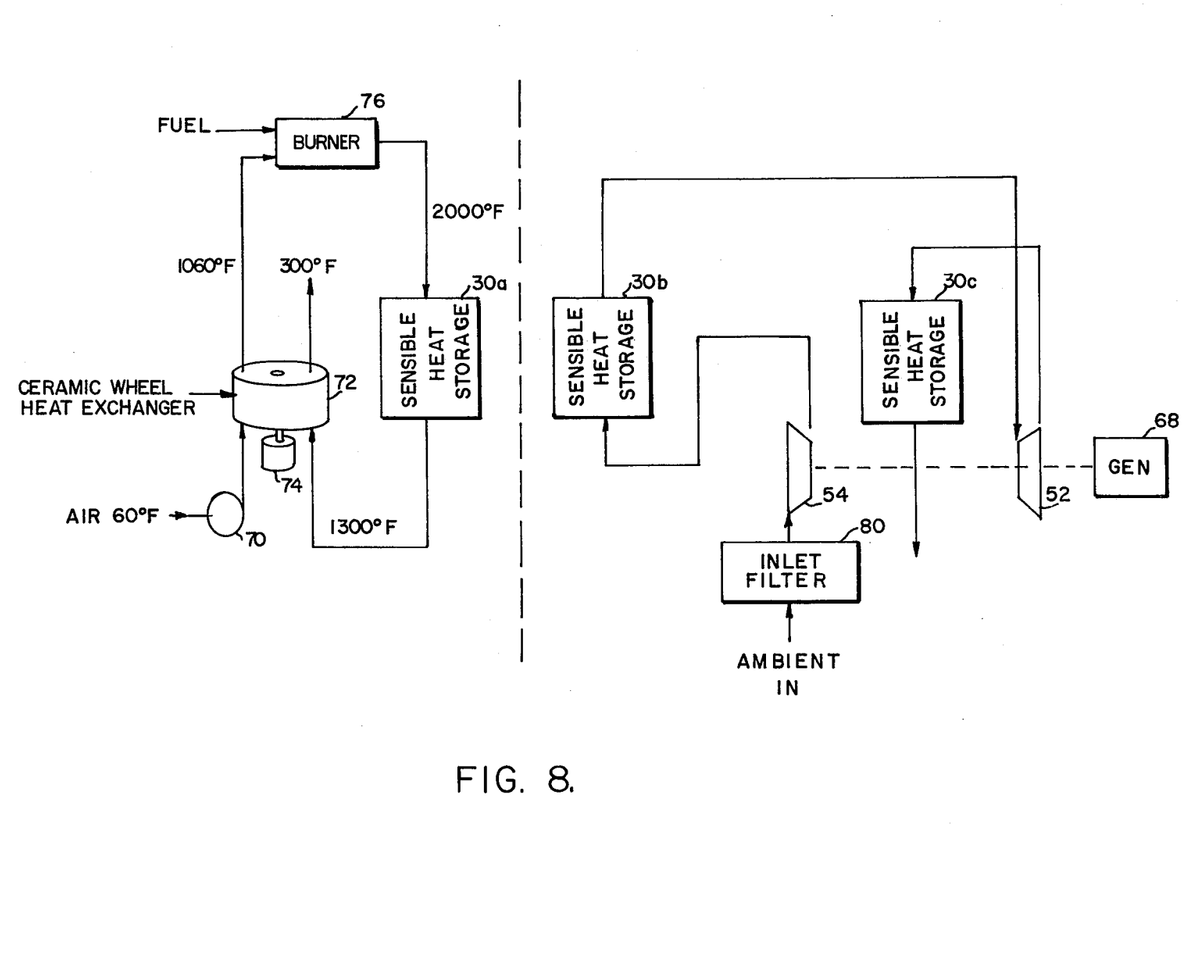
FIG. 8 is a diagrammatic illustration of a fuel fired Brayton cycle system.

When solar energy is lacking, the thermal storage unit at 30a can be switched to a burner for recharging with fossil fuels. This burner can be designed to use a wide range of fuels from heavy fuel oils to wood chips to gasolines. Such combustion takes place at ambient pressures with air which has been heated, combustion is complete and efficient with a minimum concentration of $NO_x$ products.

Referring to FIG. 8, combustion charging begins with ambient air entering a fan 70 which forces air through a rotating ceramic heat exchanger 72 driven by motor 74 where it is heated by the 1300° F. air leaving the bottom of the storage unit at 30a to a temperature of approximately 1060° F. It then enters a burner 76 where the fuel is burned and diluted with incoming air. Since the gas does no work, the only pressure required is that needed to support combustion and control the airflow. Just as in the solar collector cycle, a step function thermal gradient is developed and passes down through the storage unit until it is charged.

Combustion products of many fuels such as coal are detrimental to the turbine blades of a Brayton and therefore severely limit reliability and service life. In this embodiment these combustion products do not impinge on the turbine blades at high speeds; instead, they are trapped in the thermal storage unit where they can be removed by routine servicing. Those particles which are picked up by the low velocity airstream, 10–30 ft/sec. are small and therefore have little effect on turbine blade life. Consequently, a wide variety of fuels may be used without seriously reducing Brayton engine life.

As before, the Brayton engine cycle uses the thermal storage units at the 30b and 30c positions. Air at ambient pressure is filtered at 80 and compressed at 54 to 60 psia. The temperature of the air out of the compressor is 300° F. The pressurized air from the compressor enters the bottom of the storage unit at 30b at 300° F. and exits the top at 2000° F. where it enters the turbine. The pressure losses are of the order of a few inches of water $(\Delta P)P/<0.005$. After expansion through the turbine, air is at near-ambient pressure and at 1300° F. This air then enters the thermal storage unit at 30c and exits at 300° F., which is the temperature of the storage unit when it was switched from the 30b position. Since the same mass flow passes through the storage units at both the 30b and 30a positions, the tank size required in both these positions is the same. To accommodate a mismatch between the rate of charging at 30a and the rate of electric power generation, a fourth tank (not shown) may be used as a buffer. Under these conditions, the power plant has the operational flexibility needed to accommodate different rates of thermal energy collection and consumption. Where this system is to be used for a total energy plant, the exhaust air at 300° F. is available for heating, drying, or operating an absorption-type air conditioner.

All components of the system are fabricated from standard reliable material. The ceramic materials are all used below their normal operating temperatures and have thermal fatigue limits which far exceed those of metals. The reliability of the whole system is high and a 30 year lifetime with routine maintenance is anticipated.

In summary, the entire system involves higher thermo/mechanical efficiencies which are immediately available because recuperator effectiveness is high and in general, greater than 95% with sensible heat storage, and insofar as recuperator losses are low and in the vicinity of approximately 10 inches $H_2O$. Due to the split cycle system, the solar receiver is decoupled from power generation to allow individual flow rates. Thus, the solar receiver may be operated at atmospheric pressure, thereby eliminating the need for sealing and windows. Moreover, the lack of necessity of high pressure at the receiver permits greater safety and cost reduction as well as a long lived system due to the loose coupling of the heat exchanger within the receiver to the receiver body. Additionally, the system can be configured to collect and store solar energy over an 8 to 10 hour period and using a small engine, provide electric power over a 24 hour period.

Although preferred embodiments of the invention have been described in considerable detail for illustrative purposes, many modifications will occur to those skilled in the art. It is, therefore, desired that the protection afforded by Letters Patent be limited only by the true scope of the appended claims.

We claim:

1. Apparatus for the conversion of solar energy into mechanical energy comprising:
   a solar receiver adapted to transfer energy from focused solar radiation to a gas stream;
   a Brayton cycle engine;
   sensible heat storage means that provides a substantially constant exhaust gas temperature during operation; and
   means for charging the sensible heat storage means with heated gas from said receiver, and thereafter for discharging said sensible heat storage means so as to transfer stored energy to power the Brayton cycle engine, whereby the Brayton cycle engine is isolated from the solar energy receiver by virtue of the utilization of said sensible heat storage means.

2. The apparatus of claim 1 wherein said Brayton cycle engine includes a recuperator having an effectiveness in excess of 95% and wherein said Brayton cycle engine is operated at a pressure ratio sufficiently low to enable a thermal/electric conversion efficiency exceeding 60%.

3. The apparatus of claim 2 wherein said recuperator includes sensible heat storage means.

4. A method for increasing the efficiency of a Brayton cycle engine comprising the steps of:

charging a sensible heat storage unit with waste heat from the turbine section of the Brayton cycle engine; and discharging the sensible heat storage unit such that energy stored therein is used in powering the Brayton cycle engine.

5. The method of claim 4 and further including the step of adding energy to said sensible heat storage unit after said charging step.

6. The method of claim 5 wherein the step of adding energy includes a step of placing the sensible heat storage unit in a solar energy receiver loop such that added energy comes from insolation of the receiver within the receiver loop.

7. The method of claim 5 wherein the step of adding energy includes the step of charging said sensible heat storage unit from a fuel fired source.

8. An efficient energy conversion system comprising:
A Brayton cycle engine having a compressor section and a turbine section;
a first sensible heat storage unit having an inlet connected to the outlet of said compressor section;
means for connecting the outlet of said first sensible heat storage unit to the inlet of said turbine section; and
a second sensible heat storage unit coupled to the outlet of said turbine section to recapture waste heat therefrom.

9. The system of claim 8 and further including means to connect the outlet of said second sensible heat storage unit to the inlet of said compressor section.

10. The system of claim 8 wherein the outlet of said second sensible heat storage unit is vented to atmosphere.

11. The apparatus of claim 8 and further including means for switching said second sensible heat storage unit into the position occupied by said first sensible heat storage unit.

12. The system of claim 11 and further including means for charging said second sensible heat storage unit to a temperature exceeding that of the outlet of said turbine section prior to switching said second sensible heat storage unit into the position occupied by said first sensible heat storage unit.

13. The system of claim 12 wherein said last-mentioned charging means includes a solar receiver and means for focusing solar energy onto said solar receiver.

14. The system of claim 12 wherein said last-mentioned charging means includes a fuel fired source.

15. A method for increasing the efficiency of a Brayton cycle engine comprising substituting sensible heat storage means for the standard recuperator utilized with recuperated Brayton cycle engines.

16. Apparatus for the conversion of solar energy into mechanical energy comprising:
a receiver loop adapted to be used with solar radiation focused to a predetermined location, said receiver loop including a solar energy receiver at said predetermined location adapted to transfer energy from said focused solar radiation to a gas stream;
sensible heat storage means that provides a substantially constant exhaust gas temperature during operation;
a power loop including a Brayton cycle engine; and
means for connecting said sensible heat storage means into said receiver loop such that energy from gas heated by focused solar radiation is stored therein, and for connecting said sensible heat storage means at the input to said Brayton cycle engine during a discharge cycle so as to transfer stored energy to power said Brayton cycle engine, whereby the power loop of which the Brayton cycle engine is a part is isolated from the solar energy receiving loop by virtue of said sensible heat storage means.

17. Apparatus for the conversion of solar energy into mechanical energy comprising:
an open-ended solar energy receiver adapted to transfer energy from focused solar radiation to a gas stream;
sensible heat storage means that provides a substantially constant exhaust gas temperature during operation;
a Brayton cycle engine; and
means for connecting said sensible heat storage means to said receiver such that energy transferred to the gas heated by the receiver is stored therein, and for connecting said sensible heat storage means at the input to said Brayton cycle engine during a discharge cycle so as to transfer stored energy to power said Brayton cycle engine, whereby the Brayton cycle engine is isolated from the solar energy receiver by virtue of said sensible heat storage means to permit use of an open-ended receiver.

18. Apparatus for the conversion of solar energy into electrical energy comprising:
a receiver loop including means for focusing solar radiation to a predetermined location, a gas stream, and means including a solar energy receiver at said predetermined location for transferring energy from said focused solar radiation to said gas stream;
sensible heat storage means that provides a substantially constant exhaust gas temperature during operation;
a power loop including a Brayton cycle engine and means coupled to said Brayton cycle engine for generating electric power; and
means for connecting said sensible heat storage means into said receiver loop such that energy from gas heated by focused solar radiation is stored therein, and for connecting said sensible heat storage means at the input to said Brayton cycle engine during a discharge cycle so as to transfer stored energy to power said Brayton cycle engine, whereby the power loop of which the Brayton cycle engine is isolated from the solar energy receiving loop by virtue of said sensible heat storage means.

* * * * *